(12) United States Patent
Namiki et al.

(10) Patent No.: US 11,319,996 B2
(45) Date of Patent: May 3, 2022

(54) SENSOR ATTACHMENT STRUCTURE FOR ROLLER GUIDING DEVICE

(71) Applicant: THK CO., LTD., Tokyo (JP)

(72) Inventors: Akihiko Namiki, Tokyo (JP); Masashi Sugiura, Tokyo (JP)

(73) Assignee: THK CO., LTD., Tokyo (JP)

( * ) Notice: Subject to any disclaimer, the term of this patent is extended or adjusted under 35 U.S.C. 154(b) by 0 days.

(21) Appl. No.: 17/294,441

(22) PCT Filed: Nov. 19, 2019

(86) PCT No.: PCT/JP2019/045187
§ 371 (c)(1),
(2) Date: May 17, 2021

(87) PCT Pub. No.: WO2020/137261
PCT Pub. Date: Jul. 2, 2020

(65) Prior Publication Data
US 2021/0372477 A1 Dec. 2, 2021

(30) Foreign Application Priority Data
Dec. 26, 2018 (JP) .............................. JP2018-241982

(51) Int. Cl.
*F16C 41/00* (2006.01)
*F16C 29/00* (2006.01)
*G01M 13/045* (2019.01)

(52) U.S. Cl.
CPC ............ *F16C 41/00* (2013.01); *F16C 29/005* (2013.01); *G01M 13/045* (2013.01); *F16C 2233/00* (2013.01); *F16C 2300/02* (2013.01)

(58) Field of Classification Search
CPC ...... F16C 29/005; F16C 29/06; F16C 41/007; F16C 2233/00; F16C 2300/02; G01M 13/0045
See application file for complete search history.

(56) References Cited

U.S. PATENT DOCUMENTS

| | | | |
|---|---|---|---|
| 8,214,160 B2* | 7/2012 | Honjo ................. | G01M 13/045 702/34 |
| 2008/0065354 A1* | 3/2008 | Yoshioka ............ | F16C 29/0633 702/183 |

(Continued)

FOREIGN PATENT DOCUMENTS

| | | | | |
|---|---|---|---|---|
| CN | 208867213 U | * | 5/2019 | |
| DE | 102017206584 A1 | * | 10/2018 | .............. F16C 29/00 |

(Continued)

OTHER PUBLICATIONS

International Search Report dated Jan. 7, 2020, issued in counterpart International Application No. PCT/JP2019/045187(2 pages).

(Continued)

*Primary Examiner* — Alan B Waits
(74) *Attorney, Agent, or Firm* — WHDA, LLP

(57) ABSTRACT

Provided is a sensor mounting structure for a rolling guide device, which enables easy mounting and removal of a sensor of a type among various types with respect to the track rail, the sensor mounting structure including: a sensor holder to be fixed to an end surface of the track rail in a longitudinal direction of the track rail; and a sensor casing to be held on the track rail by the sensor holder, the sensor holder including: a base plate to be fixed to the end surface of the track rail, and a holding plate having one end continuous with the base plate as a fixed end, and another end formed as a free end elastically deformable with respect to the base plate, the holding plate being configured to urge the sensor casing toward the end surface of the track rail by the free end.

5 Claims, 3 Drawing Sheets

(56) References Cited

U.S. PATENT DOCUMENTS

| | | | |
|---|---|---|---|
| 2009/0205425 A1 | | 8/2009 | Honjo |
| 2016/0298690 A1* | | 10/2016 | Den Haak ............. F16C 41/008 |
| 2020/0056961 A1 | | 2/2020 | Honjo et al. |

FOREIGN PATENT DOCUMENTS

| | | | | | |
|---|---|---|---|---|---|
| EP | 2 133 699 | A1 | | 12/2009 | |
| JP | H1130234 | A | * | 2/1999 | ............... B23Q 5/42 |
| JP | 2006518830 | A | * | 8/2006 | ............... F16C 41/00 |
| JP | 2006-329228 | A | | 12/2006 | |
| JP | 2007178002 | A | * | 7/2007 | |
| JP | 2008-304378 | A | | 12/2008 | |
| JP | 2009-210301 | A | | 9/2009 | |
| JP | 2014214770 | A | * | 11/2014 | ............... F16C 41/00 |
| JP | 6085658 | B1 | * | 2/2017 | ............ F16C 41/007 |
| JP | 2018-84426 | A | | 5/2018 | |
| JP | 2018-179283 | A | | 11/2018 | |
| WO | 2007/099730 | A1 | | 9/2007 | |
| WO | WO-2015033969 | A1 | * | 3/2015 | ............ F16C 29/082 |
| WO | WO-2017126489 | A1 | * | 7/2017 | ............ F16C 41/00 |
| WO | WO-2017152910 | A1 | * | 9/2017 | ............ F16C 41/00 |
| WO | WO-2019171964 | A1 | * | 9/2019 | ............ G01M 13/02 |
| WO | WO-2020080102 | A1 | * | 4/2020 | ............ F16C 29/06 |

OTHER PUBLICATIONS

Decision to Grant a Patent dated Mar. 31, 2020, issued in counterpart JP Patent Application No. 2018-241982, w/ English translation (6 pages).

* cited by examiner

SENSOR ATTACHMENT STRUCTURE FOR ROLLER GUIDING DEVICE

CROSS-REFERENCE TO RELATED APPLICATIONS

This application is the National Stage of International Application No. PCT/US2019/045187, filed Nov. 19, 2019, and claims priority based on Japanese Patent Application No. 2018-241982 filed on Dec. 26, 2018, the entire contents of which are herein incorporated by reference.

TECHNICAL FIELD

The present invention relates to a sensor mounting structure for mounting a sensor of a type among various types, such as an acceleration sensor, to a track rail. The sensor mounting structure is applied to a rolling guide device in which a moving member is assembled to a track rail through intermediation of a large number of rolling elements.

BACKGROUND ART

Hitherto, a rolling guide device of this type includes a track rail and a moving member. The track rail has a rolling surface for rolling elements, which extends along a longitudinal direction of the track rail. The moving member is assembled to the track rail through intermediation of a large number of rolling elements which roll on the rolling surface, and is reciprocable along the track rail. The moving member has a load rolling surface on which the rolling elements roll while bearing a load. The load rolling surface is opposed to the rolling surface of the track rail to define a load path for the rolling elements. Further, the moving member has no-load paths for allowing the rolling elements to circulate from one end to another end of the load path. The load path and the no-load paths are continuous with one another to define an endless circulation path for the rolling elements. With such a configuration, the moving member is movable along the track rail without being limited in stroke thereof.

A product lifetime of the rolling guide device mainly depends on fatigue in the rolling surface of the track rail or the load rolling surface of the moving member. However, when the rolling surface and the load rolling surface as well as the rolling elements such as balls or rollers which roll thereon are not appropriately lubricated with lubricant or bear excessive loads, flaking of the rolling surface or the load rolling surface may occur early, with the result that the product lifetime of the rolling guide device is shortened. Further, the rolling guide device is applicable to various uses, and the progress of fatigue in the rolling surface or the like is inevitably affected by, for example, a use environment and an applied load depending on the use (hereinafter referred to as "use condition"), such as an environment in which special foreign matters fall onto the track rail or a use under an environment of an extremely high or low temperature.

Thus, in order to allow the rolling guide device to exert its original performance and fulfill its product lifetime, it is desired that an operation condition of the rolling guide device be continuously detected by various sensors, to thereby allow recognition of the state of the rolling guide device, which is varied from hour to hour, based on the detected contents.

For example, for the rolling guide device as described in Patent Literature 1, the following diagnosis system is proposed. Specifically, an acceleration sensor is mounted to the track rail or the moving member, and an output signal from the acceleration sensor is analyzed. Then, a result of the analysis is compared with predetermined reference data to determine whether the rolling guide device has an abnormality.

CITATION LIST

Patent Literature

[PTL 1] JP 2009-210301 A

SUMMARY

Problems to be Solved by Invention

In a case in which a sensor of a type among various types, such as an acceleration sensor, is fixed to the track rail, when the sensor is fixed to a side surface or an upper surface of the track rail, the sensor and the moving member interfere with each other. Accordingly, there is a disadvantage in that a stroke range of the moving member along the track rail is limited. Further, even in a case in which it is intended to retrofit the sensor of a type among various types to the track rail of the rolling guide device that is already in use for the purpose of introducing the diagnosis system described above, when interference with the moving member is taken into consideration, it is difficult to mount the sensor to the side surface or the upper surface of the track rail in some cases. Moreover, in a case in which the sensor of a type among various types is fixed to the side surface or the upper surface of the track rail, when it is required to pull out the moving member from the track rail for maintenance of the moving member, the sensor has to be specially removed from the track rail.

In a case in which it is difficult to mount the sensor of a type among various types to the side surface or the upper surface of the track rail, it is conceivable to mount the sensor to an end surface of the track rail. However, depending on a size of the track rail, the sensor cannot be arranged within the end surface of the track rail, and protrudes from the side surface or the upper surface of the track rail. As a result, it is difficult to pull out the moving member from the track rail.

Means for Solving the Problems

The present invention has been made in view of the problems described above, and has an object to provide a sensor mounting structure for a rolling guide device, which does not limit a stroke range of a moving member along a track rail and enables easy mounting and removal of a sensor of a type among various types with respect to the track rail and thus enables maintenance of the moving member in an easy manner.

That is, according to the present invention, there is provided a sensor mounting structure configured to fix a sensor of a type among various types to a track rail of a rolling guide device, the sensor mounting structure including: a sensor holder to be fixed to an end surface of the track rail in a longitudinal direction of the track rail; and a sensor casing to be held on the track rail by the sensor holder. Further, the sensor holder includes: a base plate to be fixed to the end surface of the track rail; and a holding plate having one end continuous with the base plate as a fixed end, and another end formed as a free end elastically deformable with respect to the base plate, the holding plate being configured to press the sensor casing toward the end surface of the track rail by the free end.

Effects of the Invention

According to the present invention, the sensor casing of the sensor of a type among various types is held on the end surface of the track rail by the sensor holder. Thus, mounting of the sensor does not limit the stroke range of the moving member along the track rail. Further, the sensor casing is pressed toward the track rail by the holding plate of the sensor holder. Thus, the sensor casing can easily be mounted and removed with respect to the track rail, and maintenance of the moving member can easily be performed.

MODE FOR CARRYING OUT THE INVENTION

Now, detailed description is made of a sensor mounting structure for a rolling guide device according to one embodiment of the present invention with reference to the accompanying drawings.

Figure 1:
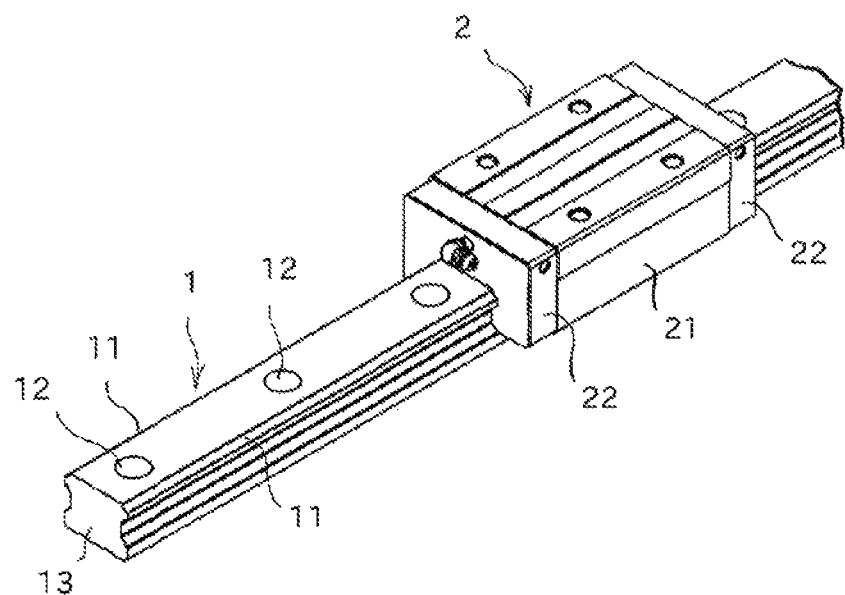
FIG. 1 is a perspective view for illustrating an example of a rolling guide device to which a sensor mounting structure according to the present invention is applicable.

FIG. 1 is a perspective view for illustrating an example of a rolling guide device to which the sensor mounting structure according to the present invention is to be applied. The rolling guide device includes a track rail 1 and a moving member 2. The track rail 1 extends linearly. The moving member 2 is assembled to the track rail 1 through intermediation of a large number of balls being rolling elements. The track rail 1 is laid on a fixed portion of various machine tools, and a movable body of a type among various types is mounted to the moving member 2, thereby being capable of guiding the movable body along the track rail 1 in a freely reciprocable manner.

The track rail 1 is formed into an elongated body having a substantially quadrangular cross section. The track rail 1 includes a plurality of rolling surfaces 11 for the balls, which are formed along a longitudinal direction of the track rail 1. Further, the track rail 1 has a plurality of bolt mounting holes 12, which are formed at predetermined intervals in the longitudinal direction and each pass through the track rail 1 from an upper surface to a bottom surface of the track rail 1. Through use of fixing bolts inserted in the bolt mounting holes 12, the track rail 1 can be firmly fixed to the fixed portion.

Meanwhile, the moving member 2 mainly includes a main body member 21 made of metal, and a pair of covers 22 made of synthetic resin. The pair of covers 22 are mounted to both ends of the main body member 21 in a moving direction of the main body member 21. The moving member 2 has a plurality of endless circulation paths for the balls so as to correspond to the rolling surfaces 11 of the track rail 1.

The main body member 21 forming the moving member 2 includes load rolling surfaces arranged to be opposed to the rolling surfaces 11 of the track rail 1, and the balls roll between the rolling surfaces 11 of the track rail 1 and the load rolling surfaces of the main body member 21 while bearing a load. Further, the main body member 21 includes return paths for the balls, which are formed in parallel to the load rolling surfaces. The balls roll in the return paths without bearing a load.

Meanwhile, each of the pair of covers 22 includes a direction change path and a scooping portion. The direction change path is configured to connect the load rolling surface and the return path to each other. The scooping portion is configured to guide the balls rolling on the rolling surface 11 of the track rail into the direction change path. Accordingly, when the cover 22 is fixed to an end surface of the main body member 21, the balls having rolled on the rolling surface 11 of the track rail 1 while bearing a load are moved away from the rolling surface 11 by the scooping portion, guided into the direction change path, and fed into the return path through the direction change path. Further, the balls having rolled in the return path are returned onto the rolling surface 11 of the track rail 1 through the direction change path. That is, when the pair of covers 22 are fixed to the main body member 21, the endless circulation paths for the balls are brought to completion.

The rolling guide device in the embodiment described with reference to the drawings is merely an example to which a sensor mounting structure according to the present invention is applicable, and the shape of the track rail 1 is not limited thereto. Further, in the rolling guide device described with reference to the drawings, the balls are used as the rolling elements. However, the present invention is also applicable to a rolling guide device using rollers.

Figure 2:
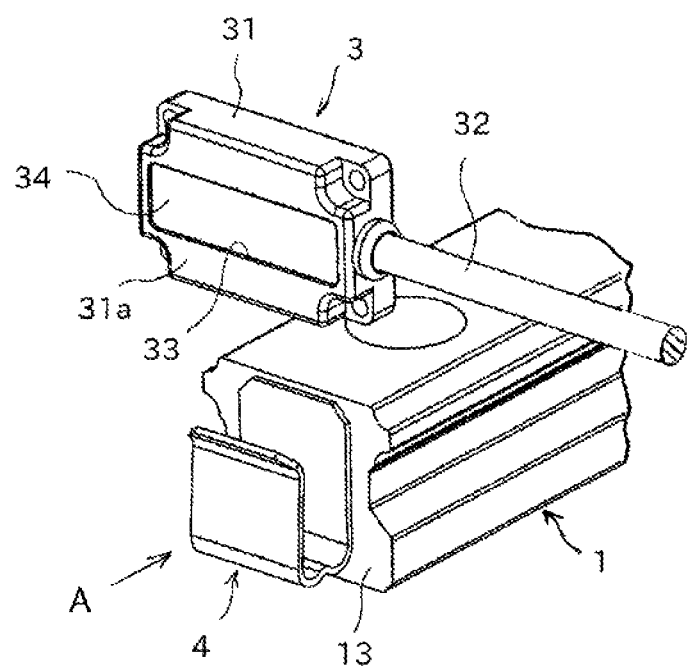
FIG. 2 is an exploded perspective view for illustrating an example of the sensor mounting structure according to an embodiment of the present invention.

FIG. 2 is a perspective view for illustrating a state in which a sensor 3 is mounted to an end surface 13 of the track rail 1 in a longitudinal direction thereof through use of the sensor mounting structure according to the present invention. The sensor 3 is configured to detect a change in physical quantity caused when the moving member 2 and the track rail 1 move relative to each other. Through analysis of a detection signal of the sensor 3, a change in state caused by long-term usage of the rolling guide device can be diagnosed.

When vibration generated in the track rail 1 is chosen as a physical quantity to be detected by the sensor 3, for example, an acceleration sensor can be used as the sensor 3. Further, when a change in sound generated when the moving member 2 moves along the track rail 1 is chosen as a physical quantity to be detected by the sensor 3, a microphone can be used as the sensor 3.

The sensor 3 illustrated in FIG. 2 is formed as an acceleration sensor, and various components and an electronic substrate forming the acceleration sensor are accommodated inside a sensor casing 31 having a substantially rectangular shape. When the sensor casing 31 is fixed to the track rail 1, vibration generated in the track rail 1 is transmitted to the sensor casing 31, and the vibration is converted into a detection signal as an electric signal. Further, a cable 32 configured to send out the detection signal to a measuring device (not shown) is led out of the sensor casing 31. In a surface 31a of the sensor casing 31, that is, a surface opposite to a surface to be brought into abutment against the track rail 1, a recessed portion 34 is formed so as to be surrounded by a regulating step portion 33. A function of the recessed portion 34 is described later.

A sensor holder 4 is fixed to the end surface 13 of the track rail 1 in the longitudinal direction, and the sensor casing 31 is mounted to the track rail 1 through intermediation of the sensor holder 4. Further, the sensor casing 31 is freely mountable to and removable from the sensor holder 4, and can be removed from the sensor holder 4 as needed.

Figure 3:
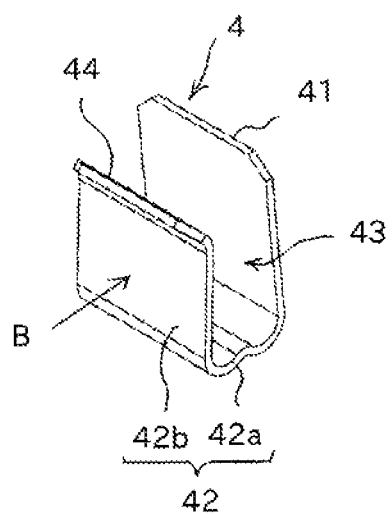
FIG. 3 is a perspective view for illustrating a sensor holder in the embodiment.

FIG. 3 is a perspective view for illustrating the sensor holder 4. The sensor holder 4 is produced by bending a metal plate made of, for example, stainless steel, and includes a base plate 41 and a holding plate 42. The base plate 41 is fixed to the end surface of the track rail 1, and the holding plate 42 is continuous from the base plate 41. The base plate 41 is firmly fixed to the end surface of the track rail 1 through screw fixation, bonding, or a magnetic force exerted by a magnet. Even when the sensor casing 31 is to be removed from the track rail 1, the sensor holder 4 itself may remain fixed to the track rail 1, and the base plate 41 can be fixed to the track rail 1 by a firm method without involving degradation over time.

One end of the holding plate 42 is continuous with the base plate 41 as a fixed end, whereas another end of the holding plate 42 is formed as a free end elastically deformable with respect to the base plate 41. Specifically, the holding plate 42 includes a base end portion 42a and a pressing portion 42b. The base end portion 42a is continuous from the base plate 41, and the pressing portion 42b is continuous from the base end portion 42a. The base end portion 42a and the pressing portion 42b join with each other in a substantially L shape, and a distal end of the pressing portion 42b is a free end. In the example of the sensor holder 4 illustrated in FIG. 3, the base end portion 42a is connected to a lower end of the base plate 41, and the pressing portion 42b overlaps the base plate 41 with an interval therebetween. Thus, the entire sensor holder 4 has a substantially U shape. Further, a space defined between the base plate 41 and the holding plate 42 is a receiving portion 43 configured to receive the sensor casing 31.

The holding plate 42 is elastically deformable with respect to the base plate 41, and the sensor casing 31 inserted into the receiving portion 43 is sandwiched between the pressing portion 42b and the base plate 41 with an urging force exerted by the pressing portion 42b. Meanwhile, the pressing portion 42b is provided not in parallel to the base plate 41 but in such an inclined state that the free end of the pressing portion 42b is slightly closer to the base plate 41 than the base end portion 42a side. Accordingly, when the sensor casing 31 is inserted into the receiving portion 43, the free end of the pressing portion 42b is pushed outward by the sensor casing 31. As a result, after the sensor casing 31 is inserted into the receiving portion 43, the sensor casing 31 is further reliably pressed onto the base plate 41. In order to allow easy insertion of the sensor casing 31 into the receiving portion 43, an introducing portion 44 is formed at the free end of the pressing portion 42b so as to be inclined to a side opposite to the base plate 41.

Further, when the sensor holder 4 is seen from a direction in which the base plate 41 and the holding plate 42 overlap, that is, the direction indicated by the arrow B of FIG. 3, a size of a contour of the sensor holder 4 is set smaller than a size of a contour of the end surface 13 of the track rail 1. Accordingly, under a state in which the sensor holder 4 is fixed to the end surface of the track rail 1 as illustrated in FIG. 2, when the track rail 1 is seen from the longitudinal direction (direction indicated by the arrow A of FIG. 2), the sensor holder 4 is arranged within the end surface of the track rail 1 without protruding from the contour of the track rail 1.

In contrast, in this embodiment, a size of the sensor casing 31 is set larger than the size of the contour of the end surface 13 of the track rail 1. Under a state in which the sensor casing 31 is mounted in the sensor holder 4, when the moving member 2 is pulled out from the end portion of the track rail 1, the sensor casing 31 and the moving member 2 interfere with each other.

Figure 4:
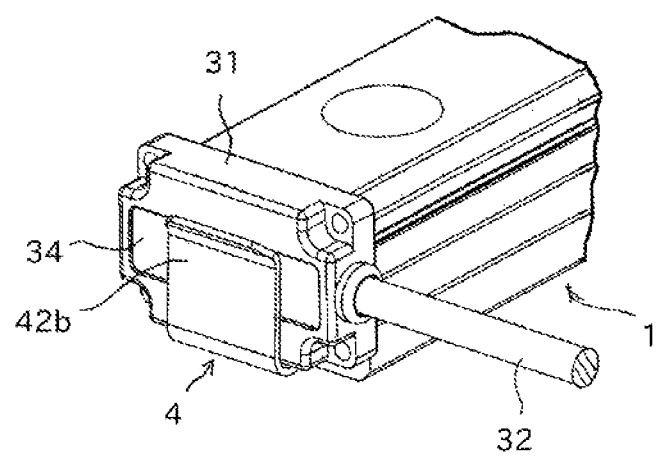
FIG. 4 is a perspective view for illustrating a state in which a sensor is assembled to the sensor holder.
Figure 5:
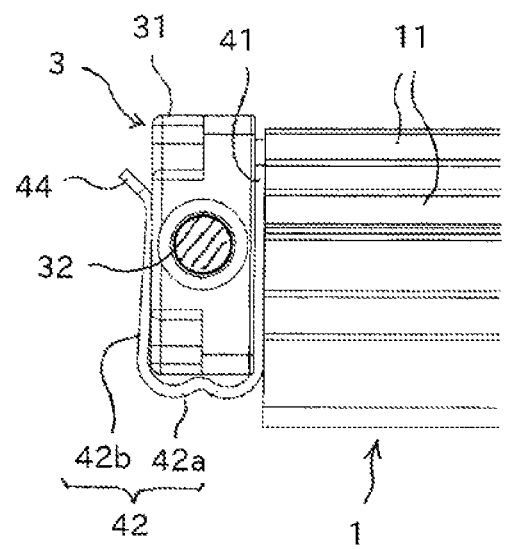
FIG. 5 is a side view for illustrating the state in which the sensor is assembled to the sensor holder.

FIG. 4 is a perspective view for illustrating a state in which the sensor 3 is mounted to the end surface of the track rail 1 by the sensor holder 4. FIG. 5 is a side view for illustrating the state illustrated in FIG. 4 when seen from a direction orthogonal to a side surface of the track rail 1. As illustrated in FIG. 4 and FIG. 5, the sensor casing 31 of the sensor 3 is inserted into the receiving portion 43 of the sensor holder 4, and is sandwiched between the base plate 41 and the holding plate 42 of the sensor holder 4. The pressing portion 42b of the holding plate 42 urges the sensor casing 31 toward the base plate 41, and hence the sensor casing 31 and the base plate 41 are held in close contact with each other. With this configuration, vibration generated in the track rail 1 is transmitted to the sensor casing 31 via the base plate 41. Thus, the sensor 3 can detect the vibration generated in the track rail 1.

In the sensor mounting structure according to this embodiment described above, the sensor holder 4 is fixed to the end surface 13 of the track rail 1, and the sensor 3 is mounted to the end surface of the track rail 1 by the sensor holder 4. Thus, the moving member that moves along the track rail, and the sensor do not interfere with each other. Therefore, a stroke range of the moving member can be set with effective use of a length of the track rail.

Further, under a state in which the sensor 3 is mounted to the end surface of the track rail 1 through use of the sensor holder 4, the pressing portion 42b of the holding plate 42 that urges the sensor casing 31 toward the base plate 41 is held in contact with the recessed portion 34 formed in the sensor casing 31. Thus, even if the sensor casing 31 is misaligned in a direction parallel to the end surface 13 of the track rail 1, the pressing portion 42b is caught by the regulating step portion 33 surrounding the recessed portion 34. Thus, the sensor casing 31 is prevented from slipping off the receiving portion 43 of the sensor holder 4, thereby being capable of keeping the sensor 3 mounted to the track rail 1 in a stable state.

In other words, under a state in which the sensor 3 is held by the sensor holder 4, a position of fixing the sensor 3 to the end surface of the track rail 1 can be adjusted by an amount corresponding to a size of the recessed portion 34 formed in the sensor casing 31. In a case in which the track rail 1 is laid on a bed or a column as the fixed portion, this configuration is effective when the sensor 3 is mounted to the end surface of the track rail 1 while avoiding interference with the fixed portion. In the sensor casing 31 illustrated in FIG. 2, the recessed portion 34 is set to have a large size in a width direction and a height direction of the track rail 1. Under a state in which the sensor casing 31 is mounted in the sensor holder 4, a position of fixing the sensor casing 31 can be adjusted in both the width direction and the height direction of the track rail 1. For example, when the position of fixing the sensor casing 31 is not adjusted in the height direction of the track rail 1, but is adjustable only in the width direction of the track rail 1, it is sufficient for the recessed portion 34 to have an elongated groove shape extending in the width direction of the track rail 1. In this case, at the time when the sensor casing 31 is held by the sensor holder 4, the sensor 3 is positioned in the height direction of the track rail 1.

Moreover, the sensor casing 31 is mounted to the track rail 1 with only the urging force of the holding plate 42b. Accordingly, only the sensor 3 can easily be removed from the track rail 1 under a state in which the sensor holder 4 is fixed to the end surface 13 of the track rail 1 as it is. Thus, with the sensor mounting structure according to this embodiment, for example, replacement and maintenance of the sensor 3 can easily be performed.

Further, in the sensor holder 4 of this embodiment illustrated in FIG. 3, as described above, the size of the contour of the sensor holder 4 is set smaller than the size of the contour of the end surface 13 of the track rail 1. Thus, even when the size of the sensor casing 31 is larger than the contour of the end surface of the track rail 1, under a state in which the sensor 3 is pulled out of the sensor holder 4 as illustrated in FIG. 2, the moving member 2 can be pulled out from the end portion of the track rail 1, or can be inserted from the end portion of the track rail 1. Therefore, when the sensor 3 is once removed from the sensor holder 4, the moving member 2 can be pulled out from the track rail 1. In combination with the configuration in which the sensor can easily be mounted and removed with respect to the track rail as described above, for example, replacement and maintenance of the moving member can easily be performed.

In the embodiment illustrated in FIG. 2, the size of the contour of the sensor holder 4 is set smaller than the size of the contour of the end surface 13 of the track rail 1, but the embodiment of the present invention is not limited thereto. The present invention encompasses a case in which the size of the contour of the sensor holder 4 is larger than the size of the contour of the end surface 13 of the track rail 1.

The invention claimed is:

1. A sensor mounting structure configured to fix a sensor to a track rail of a rolling guide device, the sensor mounting structure comprising:
   a sensor holder to be fixed to an end surface of the track rail in a longitudinal direction of the track rail; and
   a sensor casing to be fixed to the track rail by the sensor holder,
   the sensor holder including:
      a base plate to be fixed to the end surface of the track rail; and
      a holding plate having one end continuous with the base plate as a fixed end, and another end formed as a free end elastically deformable with respect to the base plate, the holding plate being configured to press the sensor casing toward the end surface of the track rail by the free end.

2. The sensor mounting structure according to claim 1, wherein the sensor casing includes a recessed portion formed in a surface of the sensor casing so as to be surrounded by a regulating step portion, and
   wherein the free end of the holding plate is brought into abutment against the sensor casing in the recessed portion.

3. The sensor mounting structure according to claim 1, wherein the sensor holder is formed into a U shape so that a space defined between the base plate and the holding plate is formed as a receiving portion configured to receive the sensor casing, and
   wherein the sensor casing is freely mountable and removable with respect to the receiving portion.

4. The sensor mounting structure according to claim 3, wherein when the sensor holder fixed to the track rail is seen from an axial direction of the track rail, the sensor holder is arranged within the end surface of the track rail without protruding from a contour of the track rail.

5. The sensor mounting structure according to claim 1, wherein the sensor is an acceleration sensor.

* * * * *